(12) United States Patent
Chiang et al.

(10) Patent No.: US 7,781,098 B2
(45) Date of Patent: Aug. 24, 2010

(54) RETICULATED AND CONTROLLED POROSITY BATTERY STRUCTURES

(75) Inventors: Yet-Ming Chiang, Framingham, MA (US); Benjamin Hellweg, London (GB)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/041,619

(22) Filed: Mar. 3, 2008

(65) Prior Publication Data

US 2008/0213662 A1    Sep. 4, 2008

Related U.S. Application Data

(62) Division of application No. 10/021,740, filed on Oct. 22, 2001, now Pat. No. 7,553,584.

(60) Provisional application No. 60/242,124, filed on Oct. 20, 2000.

(51) Int. Cl.
H01M 4/02    (2006.01)

(52) U.S. Cl. .................. 429/209; 429/304; 204/288; 204/289

(58) Field of Classification Search .................. None
See application file for complete search history.

(56) References Cited

U.S. PATENT DOCUMENTS

| | | |
|---|---|---|
| 3,765,943 A | 10/1973 | Biagetti |
| 3,864,167 A | 2/1975 | Broadhead et al. |
| 4,245,016 A | 1/1981 | Rampel |
| 4,555,454 A | 11/1985 | Shuster et al. |
| 4,599,114 A | 7/1986 | Atkinson |
| 4,615,784 A | 10/1986 | Stewart et al. |
| 4,668,596 A | 5/1987 | Shacklette et al. |
| 4,758,483 A | 7/1988 | Armand et al. |

(Continued)

FOREIGN PATENT DOCUMENTS

CA    2270771    10/2000

(Continued)

OTHER PUBLICATIONS

"Defects," Unknown book chapter, pp. 339-424.

(Continued)

*Primary Examiner*—John S Maples
(74) *Attorney, Agent, or Firm*—Wolf, Greenfield & Sacks, P.C.

(57) ABSTRACT

The effective ionic conductivity in a composite structure is believed to decrease rapidly with volume fraction. A system, such as a bipolar device or energy storage device, has structures or components in which the diffusion length or path that electrodes or ions must traverse is minimized and the interfacial area exposed to the ions or electrons is maximized. The device includes components that can be reticulated or has a reticulated interface so that an interface area can be increased. The increased interfacial perimeter increases the available sites for reaction of ionic species. Many different reticulation patterns can be used. The aspect ratio of the reticulated features can be varied. Such bipolar devices can be fabricated by a variety of methods or procedures. A bipolar device having structures of reticulated interface can be tailored for the purposes of controlling and optimizing charge and discharge kinetics. A bipolar device having graded porosity structures can have improved transport properties because the diffusion controlling reaction kinetics can be modified. Graded porosity electrodes can be linearly or nonlinearly graded. A bipolar device having perforated structures also provides improved transport properties by removing tortuosity and reducing diffusion distance.

15 Claims, 8 Drawing Sheets

U.S. PATENT DOCUMENTS

| | | | |
|---|---|---|---|
| 4,889,777 | A | 12/1989 | Akuto |
| 5,100,747 | A | 3/1992 | Hayashida et al. |
| 5,187,209 | A | 2/1993 | Hirai et al. |
| 5,213,895 | A | 5/1993 | Hirai et al. |
| 5,227,267 | A | 7/1993 | Goebel et al. |
| 5,294,504 | A | 3/1994 | Otagawa et al. |
| 5,338,625 | A | 8/1994 | Bates et al. |
| 5,399,447 | A | 3/1995 | Chaloner-Gill et al. |
| 5,405,937 | A | 4/1995 | Lemaire et al. |
| 5,436,093 | A | 7/1995 | Huang et al. |
| 5,441,830 | A | 8/1995 | Moulton et al. |
| 5,464,707 | A | 11/1995 | Moulton et al. |
| 5,478,676 | A | 12/1995 | Turi et al. |
| 5,518,833 | A | 5/1996 | Repplinger et al. |
| 5,520,850 | A | 5/1996 | Chaloner-Gill et al. |
| 5,527,641 | A | 6/1996 | Koshiishi et al. |
| 5,554,459 | A | 9/1996 | Gozdz et al. |
| 5,567,754 | A | 10/1996 | Stramel |
| 5,578,396 | A | 11/1996 | Fauteux et al. |
| 5,587,253 | A | 12/1996 | Gozdz et al. |
| 5,588,971 | A | 12/1996 | Fauteux et al. |
| 5,589,297 | A | 12/1996 | Koga et al. |
| 5,591,544 | A | 1/1997 | Fauteux et al. |
| 5,624,605 | A | 4/1997 | Cao et al. |
| 5,654,115 | A | 8/1997 | Hasebe et al. |
| 5,677,080 | A | 10/1997 | Chen |
| 5,705,291 | A | 1/1998 | Amatucci et al. |
| 5,714,053 | A | 2/1998 | Howard |
| 5,733,683 | A | 3/1998 | Searson et al. |
| 5,759,714 | A | 6/1998 | Matsufuji et al. |
| 5,789,100 | A | 8/1998 | Burroughs et al. |
| 5,821,033 | A | 10/1998 | Cromack et al. |
| 5,827,615 | A | 10/1998 | Touhsaent et al. |
| 5,834,136 | A | 11/1998 | Gao et al. |
| 5,840,087 | A | 11/1998 | Gozdz et al. |
| 5,843,292 | A | 12/1998 | Spiros |
| 5,897,522 | A | 4/1999 | Nitzan |
| 5,902,689 | A | 5/1999 | Vleggaar et al. |
| 5,910,382 | A | 6/1999 | Goodenough et al. |
| 5,925,283 | A | 7/1999 | Taniuchi et al. |
| 6,063,519 | A | 5/2000 | Barker et al. |
| 6,063,525 | A | 5/2000 | LaFollette |
| 6,069,221 | A | 5/2000 | Chasser et al. |
| RE36,843 | E | 8/2000 | Lake et al. |
| 6,096,454 | A | 8/2000 | Tran et al. |
| 6,117,593 | A | 9/2000 | Stachoviak et al. |
| 6,120,940 | A | 9/2000 | Poehler et al. |
| 6,136,476 | A | 10/2000 | Schutts et al. |
| 6,174,623 | B1 | 1/2001 | Shackle |
| 6,231,779 | B1 | 5/2001 | Chiang et al. |
| 6,280,879 | B1 * | 8/2001 | Andersen et al. ............ 429/233 |
| 6,287,720 | B1 | 9/2001 | Yamashita et al. |
| 6,291,097 | B1 | 9/2001 | Barker et al. |
| 6,300,016 | B1 | 10/2001 | Jan et al. |
| 6,306,540 | B1 | 10/2001 | Hiroi et al. |
| 6,337,156 | B1 | 1/2002 | Narang et al. |
| 6,342,317 | B1 | 1/2002 | Patel et al. |
| 6,358,645 | B1 | 3/2002 | Furukawa et al. |
| 6,403,263 | B1 | 6/2002 | Roach |
| 6,410,189 | B1 | 6/2002 | Yamada et al. |
| 6,413,284 | B1 | 7/2002 | Chu et al. |
| 6,413,285 | B1 | 7/2002 | Chu et al. |
| 6,451,487 | B1 | 9/2002 | Besner et al. |
| 6,495,283 | B1 | 12/2002 | Yoon et al. |
| 6,511,780 | B1 | 1/2003 | Veregin et al. |
| 6,528,033 | B1 | 3/2003 | Barker et al. |
| 6,555,268 | B1 | 4/2003 | Inoue et al. |
| 6,599,662 | B1 | 7/2003 | Chiang et al. |
| 6,645,675 | B1 | 11/2003 | Munshi |
| 6,753,111 | B2 | 6/2004 | Kweon et al. |
| 6,787,232 | B1 | 9/2004 | Chiang et al. |
| 6,797,435 | B2 | 9/2004 | Kweon et al. |
| 6,800,399 | B2 | 10/2004 | Matsumoto |
| 6,818,356 | B1 | 11/2004 | Bates |
| 6,855,273 | B2 | 2/2005 | Ravet et al. |
| 6,878,487 | B2 | 4/2005 | Cho et al. |
| 7,026,071 | B2 | 4/2006 | Mayes et al. |
| 7,087,348 | B2 | 8/2006 | Holman et al. |
| 7,090,785 | B2 | 8/2006 | Chiang et al. |
| 2001/0005558 | A1 | 6/2001 | Yoshioka et al. |
| 2001/0005562 | A1 | 6/2001 | Yoshioka et al. |
| 2001/0007726 | A1 | 7/2001 | Yoshioka et al. |
| 2002/0015278 | A1 | 2/2002 | Fukuyama et al. |
| 2002/0036282 | A1 | 3/2002 | Chiang et al. |
| 2002/0048706 | A1 | 4/2002 | Mayes et al. |
| 2002/0071990 | A1 | 6/2002 | Kweon et al. |
| 2002/0071991 | A1 | 6/2002 | Kweon et al. |
| 2002/0074972 | A1 | 6/2002 | Narang et al. |
| 2002/0192137 | A1 | 12/2002 | Chaloner-Gill et al. |
| 2002/0195591 | A1 | 12/2002 | Ravet et al. |
| 2003/0003352 | A1 | 1/2003 | Kweon et al. |
| 2003/0008212 | A1 | 1/2003 | Akashi et al. |
| 2003/0049529 | A1 | 3/2003 | Cho et al. |
| 2003/0054250 | A1 | 3/2003 | Kweon et al. |
| 2003/0082446 | A1 | 5/2003 | Chiang et al. |
| 2003/0099884 | A1 | 5/2003 | Chiang et al. |
| 2003/0114297 | A1 | 6/2003 | Shinn et al. |
| 2004/0005265 | A1 | 1/2004 | Chiang et al. |
| 2004/0018429 | A1 | 1/2004 | Kweon et al. |
| 2004/0018430 | A1 | 1/2004 | Holman et al. |
| 2004/0018431 | A1 | 1/2004 | Gozdz et al. |
| 2004/0185343 | A1 | 9/2004 | Wang et al. |
| 2004/0265692 | A1 | 12/2004 | Long et al. |
| 2005/0026037 | A1 | 2/2005 | Riley, Jr. et al. |
| 2005/0034993 | A1 | 2/2005 | Gozdz et al. |
| 2005/0272214 | A1 | 12/2005 | Chiang et al. |
| 2006/0102455 | A1 | 5/2006 | Chiang et al. |
| 2006/0234131 | A1 | 10/2006 | Takami et al. |
| 2007/0009801 | A1 | 1/2007 | Inagaki et al. |
| 2009/0035664 | A1 | 2/2009 | Chiang et al. |

FOREIGN PATENT DOCUMENTS

| | | |
|---|---|---|
| EP | 0071119 A2 | 2/1983 |
| EP | 1042832 A1 | 10/2001 |
| EP | 1184918 | 3/2002 |
| EP | 1231651 | 8/2002 |
| EP | 1231653 | 8/2002 |
| JP | 53-98038 | 8/1978 |
| JP | 61-004167 | 1/1986 |
| JP | 63-289768 | 11/1988 |
| JP | 0458455 | 2/1992 |
| JP | 529006 | 2/1993 |
| JP | 05-109429 | 4/1993 |
| JP | 7101728 A | 4/1995 |
| JP | 9022693 A | 1/1997 |
| JP | 9147862 | 6/1997 |
| JP | 11121006 | 4/1999 |
| JP | 11121061 | 4/1999 |
| JP | 11162519 | 6/1999 |
| JP | H11-162519 * | 6/1999 |
| WO | WO 97/44843 | 11/1997 |
| WO | WO 98/12761 A1 | 3/1998 |
| WO | WO 98/16960 A2 | 4/1998 |
| WO | WO 99/33129 A1 | 7/1999 |
| WO | WO 99/56331 A1 | 11/1999 |
| WO | WO 00/41256 A1 | 7/2000 |
| WO | WO 01/77501 A2 | 10/2001 |
| WO | WO 02/43168 A2 | 5/2002 |
| WO | WO 03/012908 A2 | 2/2003 |
| WO | WO 03/056646 A1 | 7/2003 |

| WO | WO 2008/153749 | 12/2008 |

OTHER PUBLICATIONS

May 19, 2005 Office Action issued in U.S. Appl. No. 10/206,662.
Aleshin, A.N. et al., "Transport Properties of Poly (3,4-Ethylenedioxythiophene)/Poly (Styrenesulfonate)," Synthetic Metals 94:173 (1998).
Allen, J.L., et al., "$LI_{1+x}FE_{1-x}PO_4$: Electronically conductive Lithium Iron Phospho-olivines with Improved Electrochemical Performance," *The Proceedings of The Electrochemical Society* (2003).
Arbizzani et al, "Li1.01Mn1.974 surface modification by pol(3,4-ethylenedioxythiophene)," J. Power Sources, 119-121:695-700.
Arbizzani et al., "$Li_{1.03}Mn_{1.97}O_4$ Surface Modification by Poly (3,4-Ethylenedioxithiophene)," Poster presented at 11$^{th}$ Intl. Meeting on Lithium Batteries, Jun. 23-28, 2002, Monterey, CA.
Armand, M.B. et al., "Poly-Ethers as Solid Electrolytes," Proceedings of the Intl. Conference on Fast Ion Transport in Solids, Electrodes and Electrolytes, Lake Geneva, WI, 131-136 (1979).
Bouridah, A. et al., "Poly(Dimethylsiloxane)-Poly(Ethylene Oxide) Based Polyurethane Networks Used as Electrolytes in Lithium Electrochemical Solid State Batteries," *Solid State Ionics*, 15 (1985) pp. 233-240.
Chiang, Y. et al., "High Capacity, Temperature-Stable Lithium Aluminum Manganese Oxide Cathodes for Rechargeable Batteries," Electrochem. and Solid-State Lett. 2(3):107 (1999).
Chiang, Y.-M. et al., "High Capacity, Temperature-Stable Lithium Aluminum Manganese Oxide Cathodes for Rechargeable Batteries," *Electrochem Sol St Lett*, 2 (3) (1999) pp. 107-110.
Elliott, S.R., "Physics of Amorphous Materials," Longman Group Limited.
Ep. App. No. 01 988 312.3—2119, "Communication pursuant to Article 96(2) EPC," mailed Mar. 9, 2005.
French, R.H. et al., "Full Spectral Calculation of Non-Retarded Hamaker Constants for Ceramic Systems from Interband Transition Strengths," Solid State Ionics 75:13 (1995).
French, R.H. et al., "Origins and Applications of London Dispersion Forces and Hamaker, Constants in Ceramics,"J. Am. Ceram. Soc. 83(9):2117 (2000).
Ghosh, S. et al., "Supramolecular Self-Assembly for Enhanced Conductivity in Conjugated Polymer Blends: Ionic Crosslinking in Blends of Poly(3,4,-Ethylenedioxythiophene)-Poly(Styrenesulfonate) and Poly(vinylpyrrolidone)," Adv. Mater. 10(14):1097 (1998).
Gray, F.M., "Solid Polymer Electrolytes,"VCH Publishers Inc. (1991).
Hadziioannou, et al., "Monocristaus de copolymeres trisequences styrene/isorene/styrene presentant la structure cylindrique,"Colloid Poly Sci., 257:4, 413-419.
Hart, B. W., et al., "3-D Microbatteries," Electrochemistry Communications 5:120 (2003).
Idota, Y. et al., "Tin-Based Amorphous Oxide: A High-Capacity Lithium-Ion-Storage Material," Science 276:1395 (1997).
Idota, Y. et al., "Tin-Based Amorphous Oxide: A High-Capacity Lithium-Ion-Storage Material," *Science*, vol. 276 (May 30, 1997) pp. 1395-1397.
International Preliminary Examination Report for International Application No. PCT/US 01/48345, mailed Feb. 25, 2004.
International Search Report for International Application No. PCT/US 01/48345, mailed Feb. 20, 2003.
Kuwabata, S. et al., "Charge-Discharge Properties of Composites of $LiMn_2O_4$ and Polypyrrole as Positive ElectrodeMaterials for 4 V Class of Rechargeable Li Batteries," Electrochimica Acta 44:4593 (1999).
Le Cras, F. et al., "Lithium intercalation in Li-Mg-Mn-O and Li-Al-Mn-O spinels," *Solid State Ionics*, 89 (1996) pp. 203-213.
Limthongkul, P. et al., "Nanocomposite Li-Ion Battery Anodes Produced by the Partial Reduction of Mixed Oxides," *Chem Mat*, 13 (2001) pp. 2397-2402.
Limthongkul, P. et al., "Nanocomposite Li-Ion Battery Anodes Produced by the Partial Reduction of Mixed Oxides," Chem. Mater. 13:2397 (2001).

Linden, David, Editor-in-Chief, "Handbook of Batteries", Second Edition, McGraw-Hill, Inc., USA, 1995, p. 2.19.
Long, J.W., et al., "Three-Dimensional Battery Architectures," Chem. Rev. 104:4463 (2004).
Matsumoto, Osamu et al., "Vaporization of Graphite in Plasma Arc and Identification of C60 in the Deposit," J. Electrochem. Soc., vol. 139, No. 1, Jan. 1992.
Milling, A. et al., "Direct Measurement of Repulsive Van Der Waals Interactions Using an Atomic Force Microscope," J. Colloid & Interface Science 180:460 (1996).
Minett, M.G. et al, "Polymeric Insertion Electrodes," *Solid State Ionics*, 28-30 (1988), pp. 1192-1196.
Nagaoka, K. et al, "High Ionic Conductivity in Poly(dimethyl Siloxane-co-Ethylene Oxide) Dissolving Lithium Perchlorate," Dept. of Chemistry, Sophia University, pp. 659-663.
Neumann et al. "Negative Hamaker Coefficients," Colloid and Polymer Science 257(4):414 (1979).
Ohzuku, T. et al., "Synthesis and Characterization of $LiAl_{1/4}Ni_{3/4}O_2$ (R3m) for Lithium-Ion (Shuttlecock) Batteries," J. Electrochem. Soc. 142(12):4033. Dec. 1995.
Ohzuku, Tsutomu et al., "Synthesis and Characterization of $LiAl_{1/4}Ni_{3/4}O_2$ (R3m) for Lithium-Ion (Shuttlecock) Batteries," J. Electrochem. Soc., vol. 142, No. 12, Dec. 1995, pp. 40334039.
Van Oss, C.J. et al., "Applications of Net Repulsive Van Der Waals Forces Between Different Particles, Macromolecules or Biological Cells in Liquids," Colloids and Surfaces 1:45 (1980).
Van Oss, C.J. et al., "Comparison Between Antigen-Antibody Binding Energies and Interfacial Free Energies," Immunological Communications 6(4):341 (1977).
Van Oss, C.J. et al., "Repulsive Van Der Waals Forces. I. Complete Dissociation of Antigen-Antibody Complexes by Means of Negative Van Der Waals Forces," Immunological Communications 8(1):11 (1979).
Van Oss, C.J. et al., "Repulsive Van Der Waals Forces. II Mechanism of Hydrophobic Chromatography," Separation Science and Technology 14(4):305 (1979).
Wang, C. et al., "All Solid-State $Li/Li_xMnO_2$ Polymer Battery Using Ceramic Modified Polymer Electrolytes," J. Electrochemical Soc. 149(8):A967 (2002).
Written Opinion for International Application No. PCT/US 01/48345, mailed Aug. 22, 2003.
Japanese Office Action dated Feb. 3, 2010 from Japanese Patent Application No. 2006-274391.
Examination Report from corresponding Canadian Patent Application No. 2,426,156, Mar. 2009.
International Preliminary Examination Report, from PCT/US01/48345, mailed Dec. 22, 2003.
International Search Report, from PCT/US01/48345, mailed Feb. 20, 2003.
International Search Report and Written Opinion, from PCT/US2008/006604, mailed Nov. 3, 2008.
Notice of Preliminary Rejection from corresponding Korean Patent Application No. 10-2009-7008494.
Non-Final Office Action from USPTO for U.S. Appl. No. 10/021,740, mailed Sep. 2, 2003.
Non-Final Office Action from USPTO for U.S. Appl. No. 10/021,740, mailed Jul. 1, 2004.
Non-Final Office Action from USPTO for U.S. Appl. No. 10/021,740, mailed Dec. 29, 2004.
Non-Final Office Action from USPTO for U.S. Appl. No. 10/021,740, mailed Sep. 8, 2005.
Non-Final Office Action from USPTO for U.S. Appl. No. 10/021,740, mailed Jan. 4, 2006.
Final Office Action from USPTO for U.S. Appl. No. 10/021,740, mailed Jul. 12, 2006.
Matsumoto, O., et al., "Ionic Conductivity of Dual-Phase Polymer Electrolytes Comprise of MBR-SBR Latex Films Swollen with Lithium Slat Solutions", J. Electrochem Soc., vol. 141, No. 8, Aug. 1994.

* cited by examiner

RETICULATED AND CONTROLLED POROSITY BATTERY STRUCTURES

This application is a divisional of U.S. patent application Ser. No. 10/021,740, filed Oct. 22, 2001 now U.S. Pat. No. 7,553,584, which claims priority to priority to U.S. Provisional Patent Application No. 60/242,124 filed Oct. 20, 2000, which are herein incorporated by reference in their entirety.

BACKGROUND OF THE INVENTION

1. Field of the Invention

The present invention relates generally to bipolar devices, and more particularly, to batteries having electrodes that are reticulated, or interdigitated, a controlled porosity, and to those that are perforated.

2. Description of the Related Art

Solid state energy devices, such as but not limited to lithium batteries or fuel cells, typically require high energy density as well as high power density. Power density can be related to the discharge rate, which can be a function of ion and electron transport rates. For example, an electrode in a lithium battery that is too thick can limit discharge rate because ion/electrode transport from the electrode to the interface with a separator, such as the electrolyte, can be rate limiting. On the other hand, if the electrode layers are very thin, then energy density suffers because the electrolyte, separator, and current collectors occupy a higher volume and contribute to a greater mass relative to the active material of the electrodes. In addition, the discharge rate can be limited by interface resistance allowing only a certain current rate per unit area of interface.

The lithium-ion and lithium-polymer rechargeable battery can be an attractive technology for rechargeable battery applications due to its high energy density, freedom in battery configuration, low potential for environmental and safety hazard, and low associated materials and processing costs.

Improvements in lithium rechargeable battery technology have occurred due to improvements in the storage materials used as the cathodes or anodes, or in the liquid or polymer electrolytes used with such batteries. Currently known cathode compounds such as $LiCoO_2$ and $LiMn_2O_4$ when used with currently known anodes such as lithium metal or carbon have working voltages between about three and four eV. For many applications a high voltage and low weight are desirable for the cathode as this leads to high specific energy. For example, for electrical vehicle applications the energy-to-weight ratio of the battery determines the ultimate driving distance between recharging.

Research into lithium intercalation compounds that has been conducted thus far has focused primarily on the synthesis and subsequent testing of various oxide compounds. These efforts have led to the development of a variety of compounds, including $Li_xCoO_2$, $Li_xNiO_2$, $Li_xMn_2O_4$, and $Li_xV_3O_{13}$. In addition, $Li_xTiS_2$ and other disulfides have been investigated for use in lithium intercalation.

Systems with multiple metals have been described in several patents and publications. Ohzuku, et al., "Synthesis and Characterization of $LiAl_{1/4}Ni_{3/4}O_2$ for Lithium-Ion (Schuttle Cock) Batteries," *J. Electrochem. Soc.*, vol. 142, p. 4033 (1995), and Chiang et al., "High Capacity, Temperature-Stable Lithium Aluminum Manganese Oxide Cathodes for Rechargeable Batteries," *Electrochem. Sol. St. Lett.*, 2(3) pp. 107-110 (1999) describe the mixed-metal composition of the title and report electrochemical properties thereof. Cathodes in some rechargeable lithium batteries contain lithium ion host materials, electronically conductive particles to electronically connect the lithium ion hosts to a current collector (i.e., a battery terminal), a binder, and a lithium-conducting liquid electrolyte. The lithium ion host particles typically are particles of lithium intercalation compounds, and the electronically conductive particles are typically made of a substance such as carbon black or graphite. The resulting cathode includes a mixture of particles of average size typically on the order of no more than about 100 microns.

Anodes for rechargeable lithium-ion batteries typically contain a lithium ion host material such as graphite, a binder, and a lithium conducting liquid electrolyte. Alternatives to graphite or other carbons as the lithium ion host have been described by Idota et al., in *Science* 1997, 276, 1395, and by Limthongkul et al., in "Nanocomposite Li-Ion Battery Anodes Produced by the Partial Reduction of Mixed Oxides," *Chem. Mat.* 2001.

In such cathodes or anodes, for reliable operation, good contact between particles should be maintained to ensure an electronically-conductive pathway between lithium host particles and the external circuit, and a lithium-ion-conductive pathway between lithium host particles and the electrolyte. To that, flooded electrolyte batteries have been used. Flooded electrolyte batteries are generally those wherein the electrodes are immersed in an electrolyte solution or matrix. This should improve performance by providing additional reaction sites.

Energy density can be intrinsically determined by the storage materials; the cell voltage can be determined by the difference in lithium chemical potential between cathode and anode, while the charge capacity can depend on the lithium concentration that can be reversibly intercalated by the cathode and anode. Power density, on the other hand, can be a transport-limited quantity, determined by the rate at which ions or electrons can be inserted into or removed from the electrodes.

Solid polymer electrolytes have been described. For example, Nagaoka, et al., in "A High Ionic Conductivity in Poly(dimethyl siloxane-co-ethylene oxide) Dissolving Lithium Perchlorate," Journal of Polymer Science: Polymer Letters Edition, Vol. 22, 659-663 (1984), describe ionic conductivity in poly(dimethyl siloxane-co-ethylene oxide) doped with $LiClO_4$. Bouridah, et al., in an article entitled, "a Poly(dimethylsiloxane)-Poly(ethylene-oxide) Based Polyurethane Networks Used as Electrolytes in Lithium Electrochemical Solid State Batteries," *Solid State Ionics*, 15, 233-240 (1985) describe crosslinked polyether-grafted PDMS filled with 10 wt % $LiClO_4$, and its ionic conductivity and thermal stability. Matsumoto, et al., in an article titled, "Ionic Conductivity of Dual-Phase Polymer Electrolytes Comprised of NBR-SBR Latex Films Swollen with Lithium Salt Solutions," *J. Electrochem. Soc.*, 141, 8 (August, 1994) describe a technique involving swelling poly(acrylonitrile-co-butadiene) rubber and poly(styrene-co-butadiene) rubber mixed latex films with lithium salt solutions resulting in dual-phase polymer electrolytes.

Electrodes for polymer batteries have also been described. For example, Minett, et al. in "polymeric insertion electrodes, *Solid State Ionics*, 28-30, 1192-1196 (1988)" describe a mixed ionic/electronic conducting polymer matrix formed by exposing a film of polyethylene oxide soaked in pyrrole to aqueous $FeCl_3$ solution or by exposing a film of $FeCl_3$-impregnated polyethylene oxide to pyrrole vapor. Films were assembled into all-solid-state electrochemical cells using lithium as the anode and $PEO_8LiClO_4$ as electrolyte. U.S. Pat. No. 4,758,483 (Armand) teaches of a solid polymeric electrolyte that can be used in a composite electrode. The electrolyte can include an ionic compound in solution in a copolymer of ethylene oxide and a second unit that can be an ethylene polyoxide structure including side-group radicals that introduce structural irregularities into the system reducing or eliminating crystallinity. A lithium salt, such as lithium perchlorate, can be dissolved in the polymer system.

While significant advances in battery formulations have been made, there is much room for improvement in increased power density and energy density in these types of devices.

BRIEF SUMMARY OF THE INVENTION

In one embodiment, the present invention provides an energy storage device comprising at least one reticulated electrode in ionic contact with an electrolyte.

In another embodiment, the present invention provides an energy device comprising a first electrode having features defining a plurality of extensions into an electrolyte matrix.

In another embodiment, the present invention provides a bipolar device. The bipolar device comprises a first electrode having a first set of proturberances extending into an electrolyte and a second electrode having a second set of protuberances constructed and arranged to be complementary to the first set of protuberances.

In another embodiment, the present invention provides an electrode comprising a framework having a porous network defined therein.

In another embodiment, the present invention provides a battery. The battery comprises a first electrode, a second electrode, a first current collector in electronic communication with the first electrode and a second current collector in electronic communication with the second electrode. The first electrode includes a portion, positioned between the first current collector, and a second electrode, having a porosity that increases in a direction from the first current collector toward the second electrode.

In another embodiment, the present invention provides an apparatus comprising a first electrode having a first mating surface for positioning proximate an opposing electrode, the mating surface reticulated so as to define a plurality of protrusions and intervening indentations providing a surface area at least 1.5 times the theoretical surface area of the first mating surface in a smooth, non-reticulated configuration.

In another embodiment, the present invention provides an electrode comprising a plurality of channels defined therein and constructed and arranged to allow diffusion of an ionic species from an electrolyte to a surface thereof.

In another embodiment, the present invention provides a battery comprising an electrode in contact with an electrolyte and having a plurality of channels defined therein, the channels constructed and arranged to allow diffusion of an ionic species from the electrolyte to a surface thereof.

In another embodiment, the present invention provides a battery comprising at least one perforated electrode in ionic communication with an electrolyte.

In another embodiment, the present invention provides a bipolar device comprising a porous electrode that is free of polymer binder.

In another embodiment, the present invention provides a bipolar device comprising a porous electrode that is free of carbon additive.

In another embodiment, the present invention provides a method for facilitating providing energy. The method comprises the step of providing a battery comprising a first electrode, a second electrode, a first current collector in electronic communication with the first electrode and a second current collector in electronic communication with the second electrode, wherein the first electrode includes a portion, positioned between the first current collector and the second electrode, having a porosity that increases in a direction from the first current collector toward the second electrode.

Other advantages, novel features, and objects of the invention will become apparent from the following detailed description of the invention when considered in conjunction with the accompanying drawings, which are schematic and which are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF DRAWINGS

Preferred, non-limiting embodiments of the present invention will be described by way examples with reference to the accompanying figures, in which.

DETAILED DESCRIPTION

To improve the intrinsic transport properties of electrochemically active oxides, a three-phase porous electrode can be used to improve the rate-limitation. A carbonaceous conducting additive and an electrolyte material can be added to the storage material, lithium, cobalt oxide, for example, to improve the electronic and ionic conductivity.

Typically, microstructural features control the critical properties of such materials. Accordingly, the microstructure of components in such systems is tailored to optimize desirable properties and minimize the undesirable ones.

Figure 1:
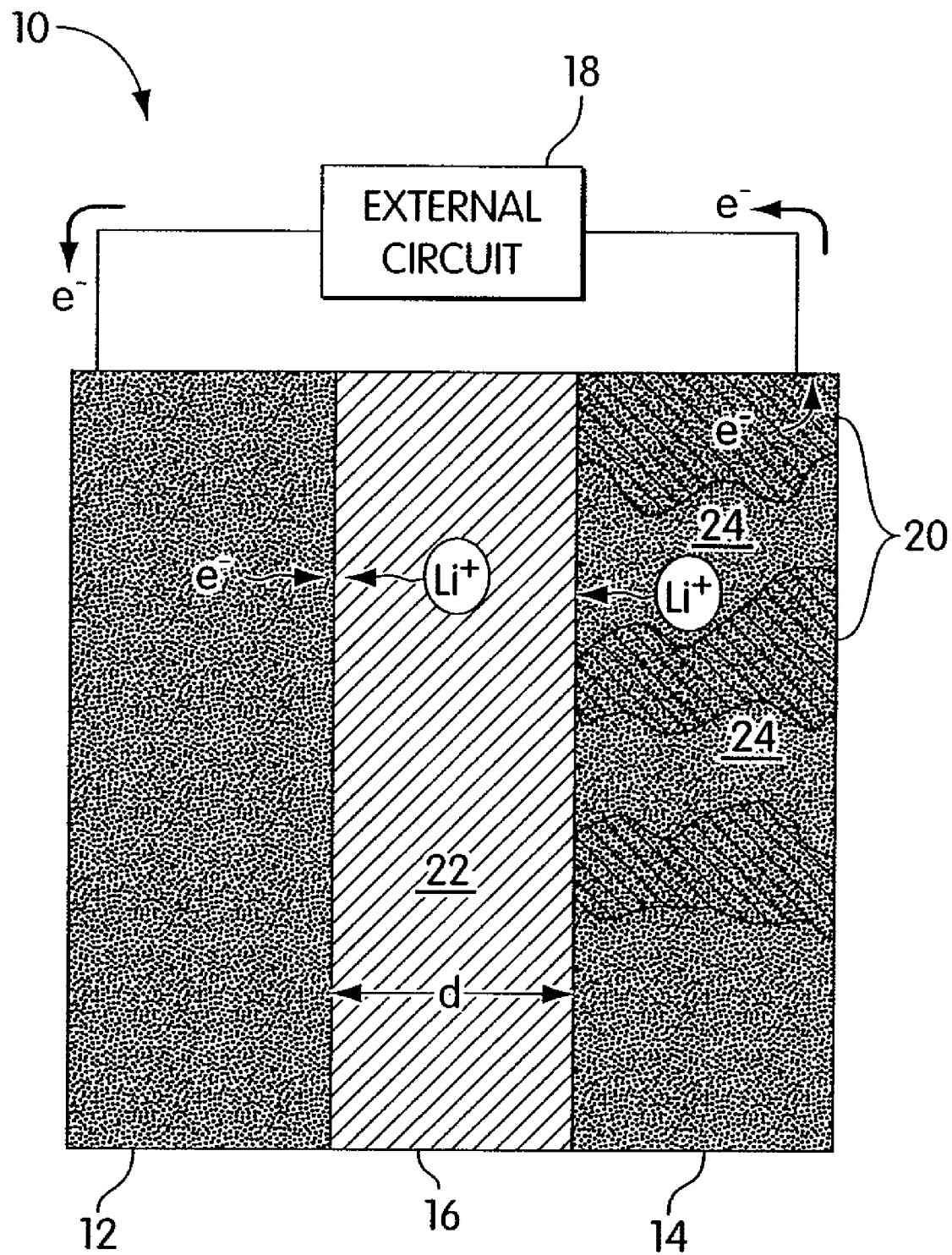
FIG. 1 is a schematic illustration showing an anode/cathode system that can be used in accordance with the present invention.

A bipolar device according to one embodiment of the present invention is schematically depicted in FIG. 1. The bipolar device 10, which can be an energy storage system, can use, in one embodiment, a $LiCoO_2$/carbon combination. In some cases, a solid polymer energy storage system, such as a battery, can be provided and comprises an electrolyte 16, lithium metal anodes 12, and cathodes 14. Energy storage devices according to the present invention, such as but not limited to lithium ion batteries, can be based on liquid electrolytes. For example, the typical lithium battery has a lithium foil or a composite carbon anode, a liquid electrolyte with a lithium salt and a composite cathode. During discharge, lithium ions move through the electrolyte from the anode to the cathode, and then intercalate into the oxide storage material. To preserve charge neutrality, electrons are driven through the external circuit 18 to complete the electrochemical reaction. Preferably, the electrode should provide fast transport for both electrons and lithium ions.

Realizable energy and power density is typically influenced by system design, including, for example, component arrangement and selection. Typical high-performance rechargeable energy storage systems are of laminate construction, and can use composite electrodes that are typically a mixture of active material, binder, and conductive additive. The system can be flooded with organic liquid electrolyte. The thickness of the cathode in a lithium-ion battery is typically less than 200 µm, and for high power batteries, less than 100 µm. To maximize the packing density of storage material, for high energy density, the pore channels can be made to be tortuous and limited in cross-sectional area. It is believed that the rate-limiting transport step is, in most instances Li+ ion diffusion, through the liquid-filled pore channels of the composite electrode. Currently the "cell stack" can be two metal foil current collectors, anode, separator, and cathode, that is about 250 µm thick.

A lithium ion battery will be used to generally describe the various aspects of the present invention. The description of such a lithium ion bipolar device is meant to be exemplary and the use of the various features and aspects of the present invention to other systems is considered to be within the scope of the present invention. For example, the below described reticulated, perforated or controlled porosity structures can be used for energy storage or energy conversion systems including but not limited to primary (disposable) and secondary (rechargeable) batteries.

The lithium battery can be charged by applying a voltage between the electrodes 12 and 14, which causes lithium ions and electrons to be withdrawn from lithium hosts at the battery's cathode. Lithium ions flow from cathode 14 to anode 12 through electrolyte 16 to be reduced at the anode. During discharge, with reference to FIG. 1, the reverse occurs; lithium ions and electrons enter lithium hosts 20 at cathode 14 while lithium can be oxidized to lithium ions at anode 12, which is typically an energetically favorable process that drives electrons through an external circuit 18, thereby supplying electrical power to a device to which the battery is connected. Thus, during battery operation, for example, lithium ions pass through several steps to complete the electrochemical reaction. Typically, the steps include, dissolution of lithium at the anode surface, which typically releases an electron to the external circuit; transport of the lithium ions through the electrolyte (which can reside in pores of a separator and, with porous electrodes, in the electrodes' pores) separator, for example, the electrolyte; transport of the lithium ions through the electrolyte phase in a composite cathode; intercalation into the active cathode material, which typically receives electrons from the external circuit; and diffusion of lithium ions into the active material along with electron transport from a current collector to the intercalation sites.

The lithium dissolution at the anode and the intercalation reaction at the cathode-electrolyte interface can be thermally activated and can be generally characterized by reaction kinetics. The charge transfer reactions, typically at the electrodes, are believed to be relatively fast at room temperature and, thus, not necessarily rate-limiting. Nevertheless, such reactions can be accelerated by increasing the surface area of the reaction. Reducing the particle size of the intercalation material can increase the rate of reaction. Ion intercalation into an electrode can be characterized by diffusion. For typical intercalation oxides at room temperature, the diffusion time, in a typical energy storage device, across a typical distance of about one µm can be about ten seconds. Notably, diffusion limitations can be reduced by reducing the oxide particle size but can be addressed by altering other diffusion parameters.

Ion transport across the separator 16 typically occurs in two regions, the separator region 22 and the electrode region 24. In the former, generally, no electrochemical reactions occur and transport phenomena can be governed by the separator physical properties. The rate associated with this phenomenon can be reduced by designing or optimizing separator physical properties or by minimizing the transport distance across the separator. In the latter, ion transport can occur through the electrolyte-filled pore channels or network structures of the electrode. The ion transport can be affected by, for example, the tortuosity of the average ion transport path. In some systems, the ionic current changes with electrode depth because of the electrochemical reaction.

The effective ionic conductivity in a composite structure 12 or 14 is believed to decrease rapidly with decreasing pore volume fraction, said pores being filled with electrolyte. Accordingly, in one embodiment, the present invention provides an electrode structure 12 or 14 that favors or promotes ion transport. For example, according to one embodiment, the present invention provides a system comprising lamellar particles arranged to be substantially parallel to the direction of current flow. With such a lamellar microstructure, the volume fraction of active material can be increased without reducing ionic conductivity.

According to another embodiment, the present invention provides a bipolar device 10 having a design in which the current collector and electrolyte mass is minimized while the anode and cathode structures mass are maximized. In one embodiment, the diffusion length, d, or path that electrodes or ions must traverse is minimized and the interfacial area exposed to the ions or electrons is maximized.

Figure 3A:
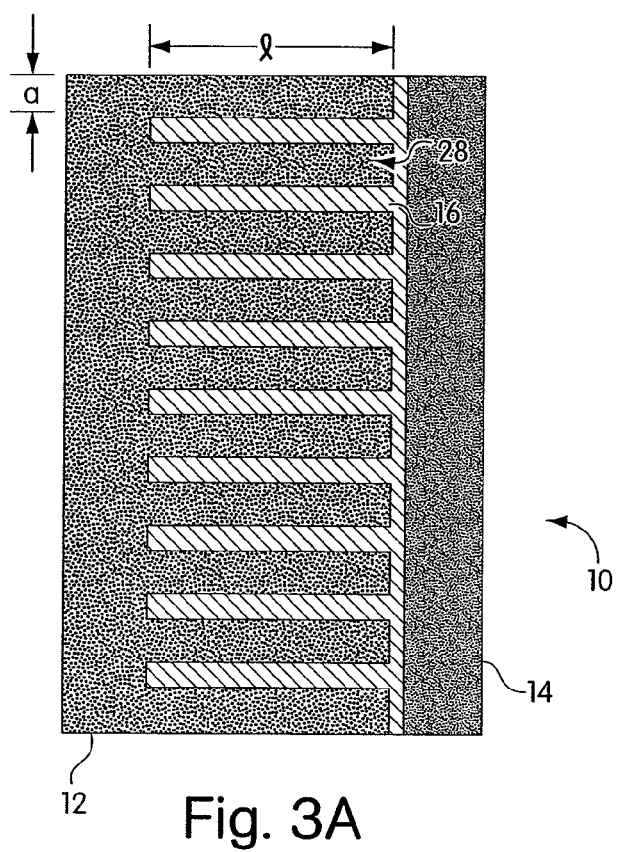
FIGS. 3A-3D are schematic (cross-section) illustrations showing bipolar devices with various reticulated electrodes according to another embodiment of the present invention.
Figure 3B:
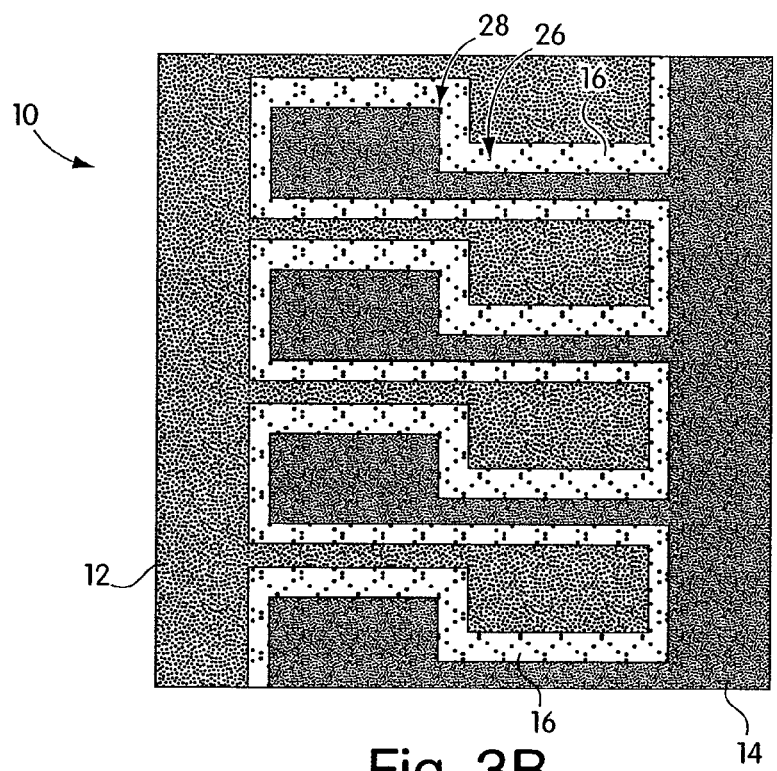
Figure 3C:
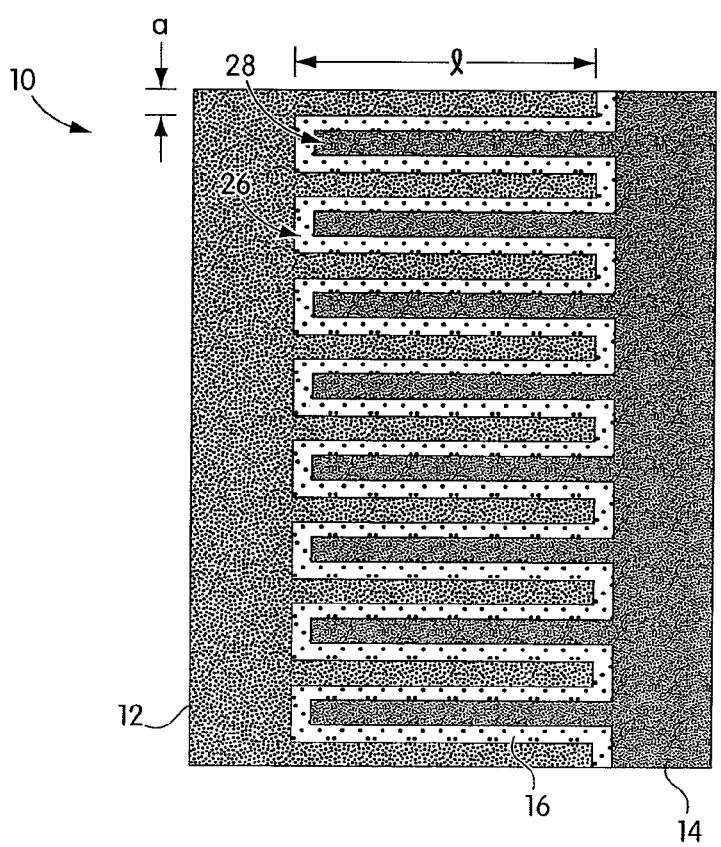
Figure 3D:
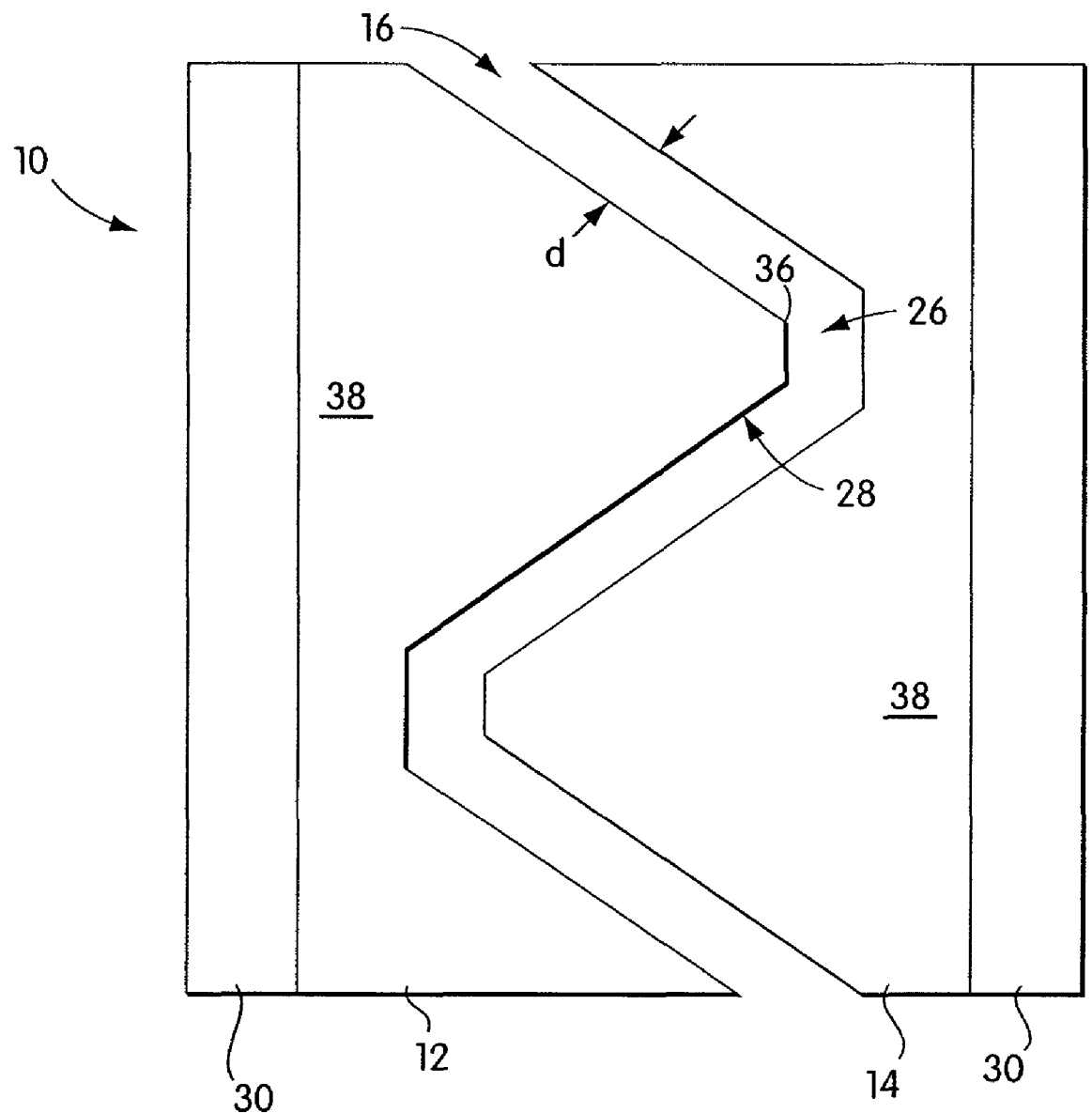

That is, in one embodiment, the system can include components or structures that can be reticulated or has a reticulated interface so that an interface area can be increased. In this way, the increased interfacial perimeter increases the available sites for reaction of, for example, ionic species. Many different reticulation patterns can be used according to the present invention including the reticulated structures shown schematically in FIGS. 3A-3D. In one embodiment, the aspect ratio l/a of this feature can be varied where l is the length of a protrusion (or indentation), described below, and a is its width or thickness. Such a bipolar device can be fabricated by a variety of methods or procedures, as described below. FIGS. 3A-3D show systems having a variety of reticulated structures. In FIG. 3A, system 10 has a reticulated anode 12 having a plurality of extensions 28 extending into and in ionic communication with electrolyte matrix 16. In this embodiment, cathode 14 is shown as non-reticulated. Similarly, according to another embodiment, FIG. 3B shows system 10 having a reticulated anode 12 and a reticulated cathode 14, each having protrusions 28 and complementary indentations 26 that are separated from each other at a uniform distance. Anode 12 and cathode 14 can be in ionic and/or electronic communication with electrolyte 16. In FIG. 3C, system 10 has complementary reticulated structures 12 and 14, each being interdigitated, the reticulations having a length, l, and a width or thickness, a. In FIG. 3D, system 10 has reticulated structures 12 and 14, each in electronic communication with a current collector 30. The reticulations form convexities 28 that are at a separation distance, d, from correspondingly-shaped concavities 26.

In addition to producing a single layer cell, or a stack, a multilayer cell with a higher energy density and power density can be achieved with the same materials in a planar interface design. The present invention provides systems or cells with a wide range of properties, for example, discharge rates, power densities, that can be made of the same set of materials. This provides flexibility and can lead to a more efficient design, prototyping and manufacturing sequence, as well as providing a tailorable or customizable bipolar device. A bipolar device having structures of reticulated interface can be tailored for the purposes of controlling and optimizing charge and discharge kinetics.

In the present invention, "reticulated interface" or "interdigitated electrode" refers to a battery 10 that has a structure, such as a positive and/or a negative electrode 12 and 14 each of which can be connectable to a current collector 30 everywhere, including cases where the positive and negative electrodes serve as their own current collector and having a morphology such that the surface exposed is reticulated, having convexities 26 or protrusions 28 and, correspondingly, concavities or indentations, sufficient to produce features with a thickness or width that is less than the maximum thickness or width of each electrode. Such features may be periodic and regularly spaced or aperiodic or random. The morphology of the structures exhibit shape complementarity towards one another such that where one electrode has a protrusion, the other tends to have a indentation of similar shape and dimension. The positive and negative electrode can be separated everywhere along their "mating" interface by a layer or region of electrolyte 16. In some embodiments, especially with respect to systems with shape complementary structures, the layer of electrolyte 16 can be thin and can have a relatively uniform thickness.

It is preferred that the spatially-averaged thickness of the layer of electrolyte or separator between positive and negative electrodes be less than about 100 microns, preferably less than about 50 microns, still preferably less than about 25 microns, and still preferably less than about 10 microns. It is also preferred that the reticulated features of the positive and negative electrode have a thickness, when averaged along the length of the protrusion or indentations, that is less than about 100 microns, preferably less than about 50 microns, still preferably less than about 25 microns, and still preferably less than about 10 microns. Such designs can decrease the volume of the systems that would normally be consumed by the separator, electrolyte, binder, conductive additive, and other inert components that, in some embodiments, do not store lithium, and thereby increases the energy density of the battery on a volume or weight basis.

Having the above stated dimensions, this design also has improved power on a volume or weight basis compared to batteries of conventional design, because the ion diffusion distance can be decreased. In a conventional laminated battery design in which the thickness of the positive and negative electrodes are approximately uniform, during charging or discharging the ions must diffuse across the thickness of the electrodes. In a conventional lithium ion device, the electrode thickness is typically about 100 to about 200 micrometers. In most such systems the rate of transport of lithium ions across the electrode thickness limits the power. The transport rate of electrons is believed to be much higher and is not necessarily rate-limiting. In the present invention, when applied to a lithium ion battery, the lithium ion diffusion distance can be decreased, from a value equal to the electrode thickness to a value equal to the lateral dimensions of the reticulated or interdigitated features.

Figure 4:
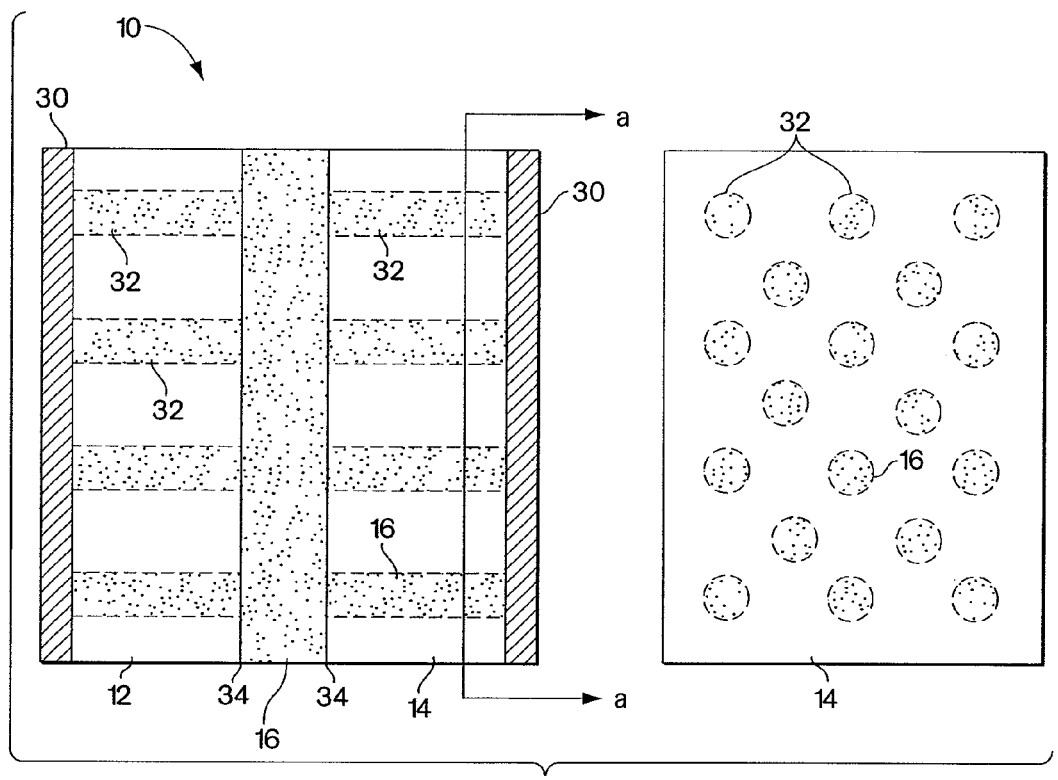
FIG. 4 is a schematic illustration showing a bipolar device having a perforated structure according to another embodiment of the present invention.

In another embodiment, the present invention provides increasing the interfacial area between an electrode of a bipolar device and a separator or electrolyte to reduce the diffusion distance or to minimize the length of diffusion paths. In some cases, as shown in schematically in FIG. 4, the present invention provides a system 10 having a perforated structure, such as an electrode 12 and 14, that has a plurality of channels 32 defined therein. In one embodiment, the plurality of channels can be filled with electrolyte material. Such a structure can improve ionic diffusion by minimizing diffusion tortuosity. Thus, the effective diffusion length can be decreased. In some cases, perforated preferred electrodes can be used as a composite cathode in lithium ion batteries. In another embodiment, the present invention provides a thin film battery wherein the electrode can be a dense single phase material that has a plurality of channels filled with solid electrolyte 16. The right side of FIG. 4 shows a cross-section along a-a of electrode 14. The cross-section shows electrolyte 16 in the channels 32 of electrode 14. The channels can extend through and across the electrode, from the front at interface 34 with separator 16 to the back near current collector 30. Channels 32 provide ionic communication between the back of the electrolyte and the region near the back of an electrode. This alternate transport path should reduce the transport distance by removing tortuosity that an ionic species may travel. Channels 32 can have a variety of cross-sectional shapes such as, but not limited to circular, as shown in FIG. 4, rectangular or polygonal.

The present design can also provide a system wherein the charge or discharge characteristics can be selectively tuned by altering the dimensions of the reticulated or interpenetrating features. Microfabrication approaches such as those described below allow these feature shapes and dimensions to be readily varied thus providing improved control over system characteristics without relying on the type of material. This improves design, prototyping, and manufacturing, compared to conventional energy storage systems where materials formulations are typically empirically adjusted to achieve desired properties. In another embodiment, the present invention provides improved ion transport in a composite structure, such as an electrode, by adjusting the ionic conductivity relative to the current distribution in the structure. When a charge transfer current in the electrode particles is rate-limiting, the current carried by the electrolyte phase in the electrode can decrease with depth. Such a phenomenon typically indicates that the ionic conductivity of the electrolyte phase near the region away from the electrolyte separator may not be critical while a high ionic conductivity near the electrode surface requires rapid ion transport towards the bulk of the electrode structure. Accordingly, in one embodiment, the present invention provides improved transport rates by grading the porosity, or porosity density, of the electrode structure. A high volume fraction of electrolyte near the interface, with the bulk electrolyte, can improve ionic conductivity in the region where ion current can be high, to improve rate capability, while a higher fraction of the active material in the depth of the electrode allows retaining a high energy density.

The present invention provides a variety of graded porosity arrangements including, but not limited to, linear, concave up and concave down porosity gradients. An electrode, for example, with a linear porosity gradient typically has a continuously, or at least a non-discretely, varying porosity from one region to another region. For example, an electrode can have a linearly varying porosity, filled with electrolyte, in one embodiment, so that a porosity of 0.4 can be at the front 36 of the electrode, near the electrolyte, and a porosity of 0.2 can be at the back 38 of the electrode, near the current collector. The back refers to the region of an electrode that is in electronic communication with a current collector and the front refers to the region of an electrode that is positioned adjacent the separator electrolyte. In other embodiments, the electrode has a porosity that can have concave up or concave down profile.

The porosity can average from about 10% to about 70%. It is believed that if the porosity is too high, above about 80%, then the framework may be structurally unstable; if the porosity is too low, below about 10%, then there is only an incremental increase in power or energy density. Accordingly, the average porosity is, preferably from about 20% to about 50%. In another embodiment, the average porosity is from about 30% to about 45%. In some embodiments, the porosity gradient in an electrode, from the current collector toward the electrolyte or the other electrode, varies by at least about 10% from the average porosity, preferably, at least about 20%, more preferably, at least about 30%. In other embodiments, at any cross-section of an electrode perpendicular to a line connecting the center of mass of the current collector and the center of mass of the other electrode, the porosity variation is uniform to about +/−10%, preferably about +/−5%, more preferably, about +/−3%, and even more preferably about +/−1%.

Thus, the system can have structures that have a porous network in a framework. The porous network can be ionically interconnected so that ions can diffuse to the cavities defining the porosity at any location within the porous structure. For example, a lithium ion can diffuse from the bulk electrolyte to any ionically interconnected location in a porous electrode.

Figure 5:
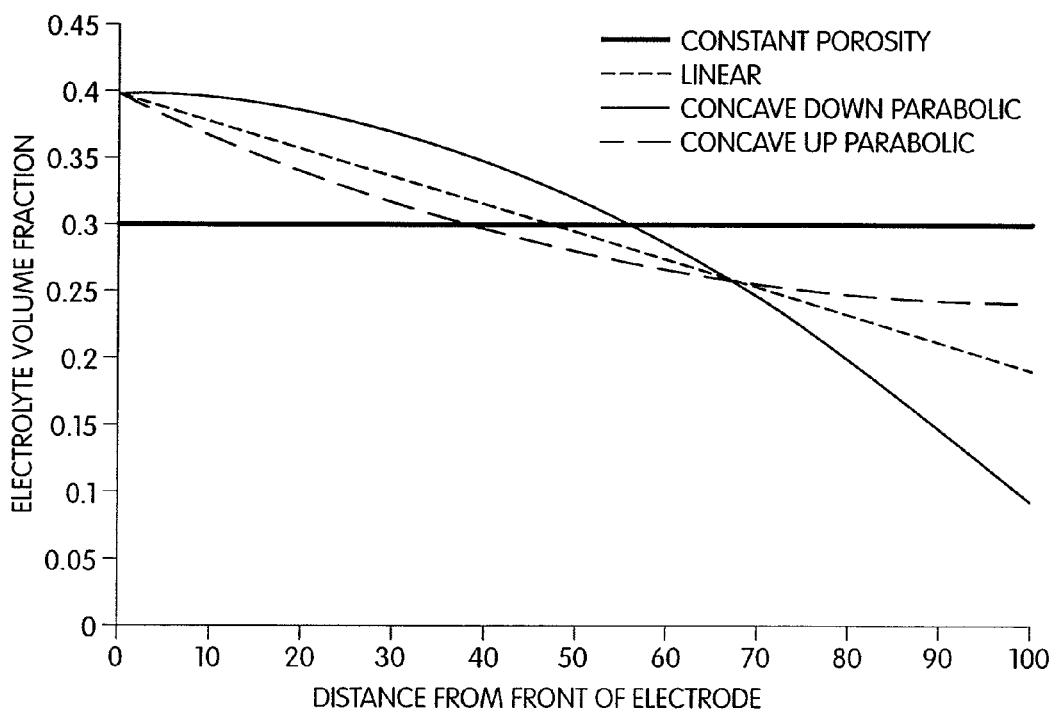
FIG. 5 is a graph showing electrolyte volume fraction as a function of distance in an electrode according to one embodiment of the present invention.

These graded porosity gradients are graphically illustrated in FIG. 5. In FIG. 5, the average porosity is about 0.3 and each of the graded porosity electrodes has a porosity of about 0.4 at the front of the electrode, which corresponded to an electrolyte fraction of 0.4.

Figure 2:
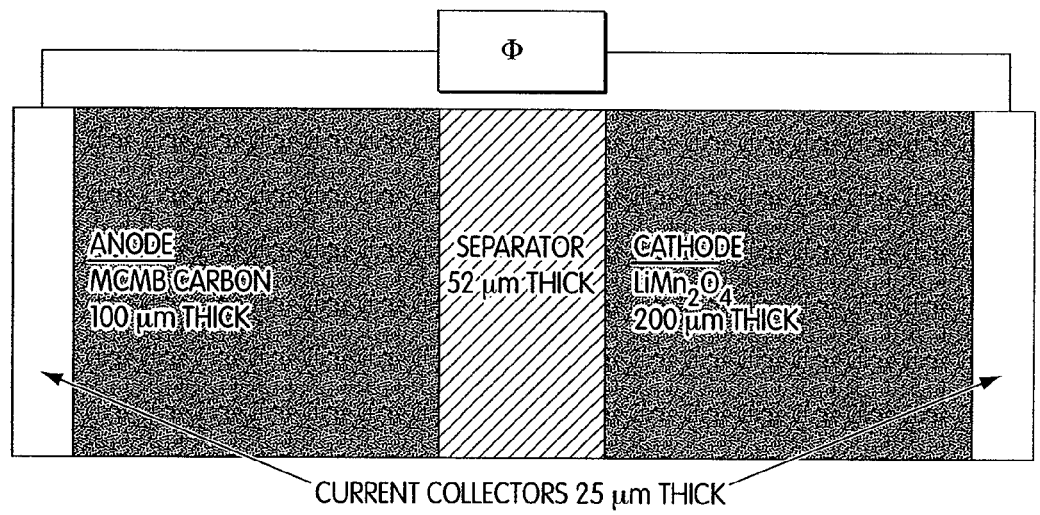
FIG. 2 is another schematic diagram illustrating another embodiment of the present invention illustrating simulated cells.

The performance of the bipolar system shown in the figures relates to a typical $LiMn_2O_4$ spinel cathode with a EC/DEC/ $LiPF_6$ electrolyte and either a MCMB carbon or lithium anode schematically illustrated in FIG. 2. The mesoporous carbon microbeads (MCMB) carbon anode was used for evaluations of graded porosity electrodes. For discharges, a spinel cathode was assumed with an initial lithium content of $Li_{0.1705}Mn_2O_4$. The systems were simulated to be discharged to a cutoff of about 3.5 V. The cathode thickness was assumed to be about 200 μm; the electrolyte thickness was assumed to be about 52 μm and the anode thickness was assumed to be about 100 μm. In the figures, various gradients are shown for an average porosity of 0.3.

Figure 6:
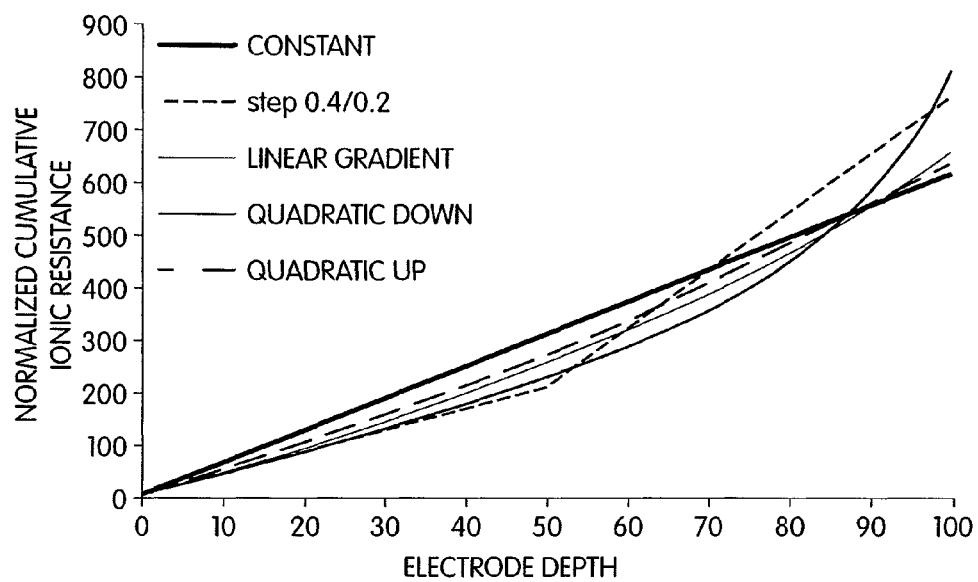
FIG. 6 is a graph predicting a normalized cumulative ionic resistance in a greater porosity structure in a bipolar device according to one embodiment of the present invention.
Figure 7:
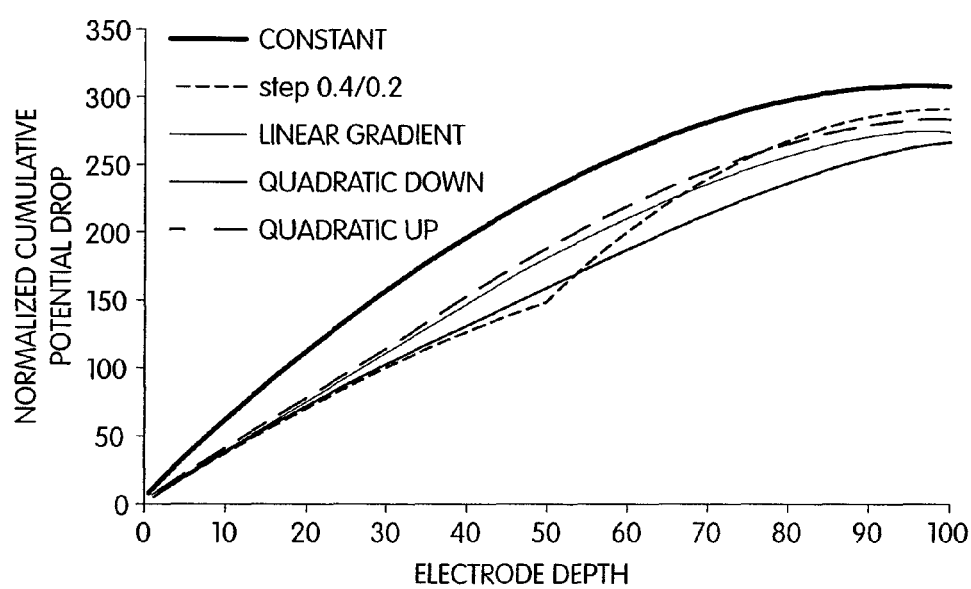
FIG. 7 is a graph showing a normalized cumulative potential drop in a greater porosity structure in a bipolar device according to one embodiment of the present invention.
Figure 8:
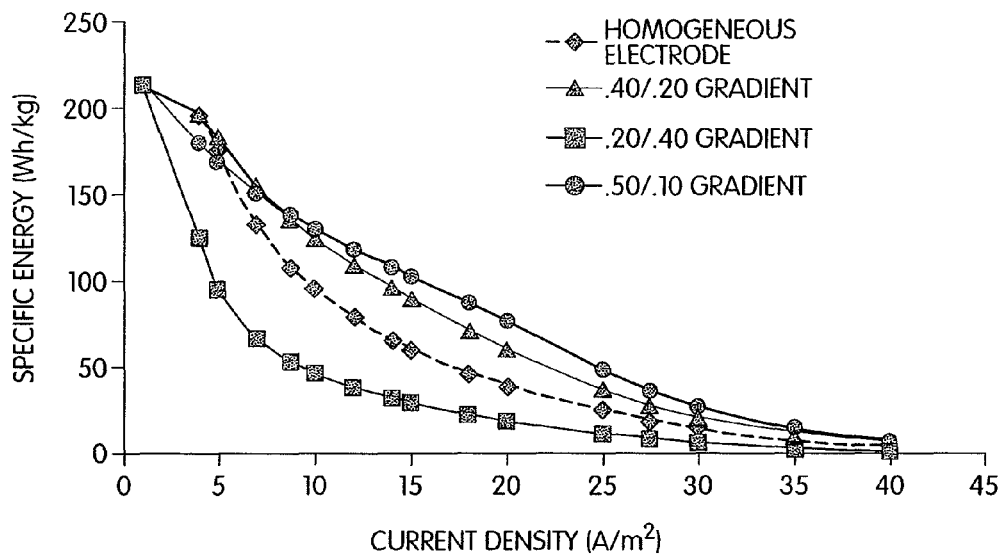
FIG. 8 is a graph showing the specific energy of a greater porosity structure as a function of current density in a bipolar device according to one embodiment of the present invention.
Figure 9:
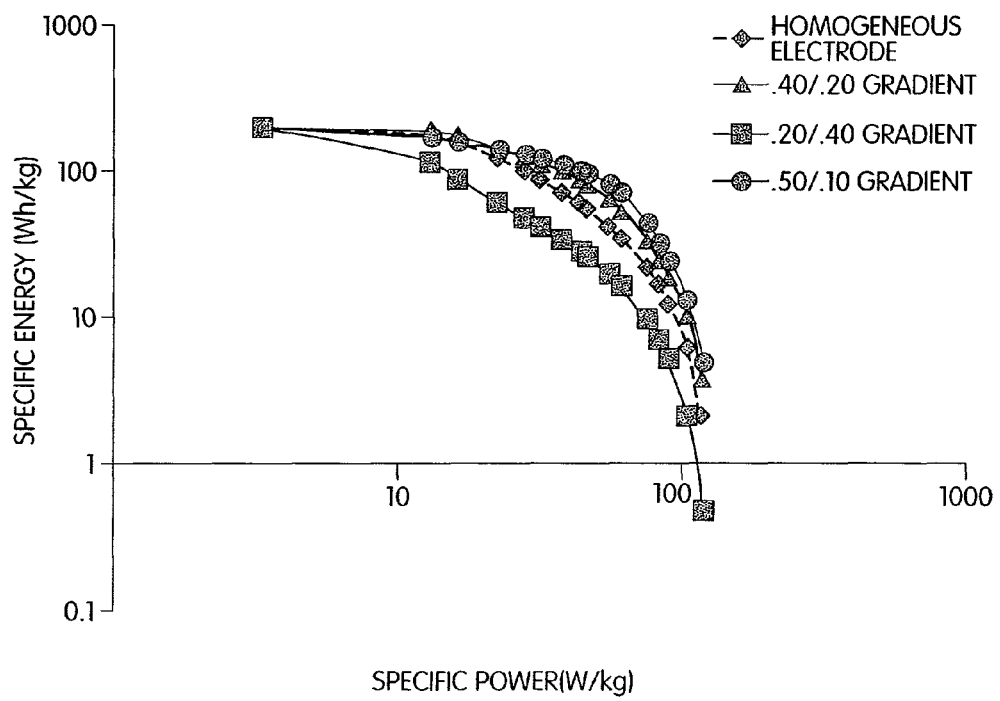
FIG. 9 is a graph showing the specific energy as a function of specific power in a bipolar device according to one embodiment of the present invention.
Figure 10:
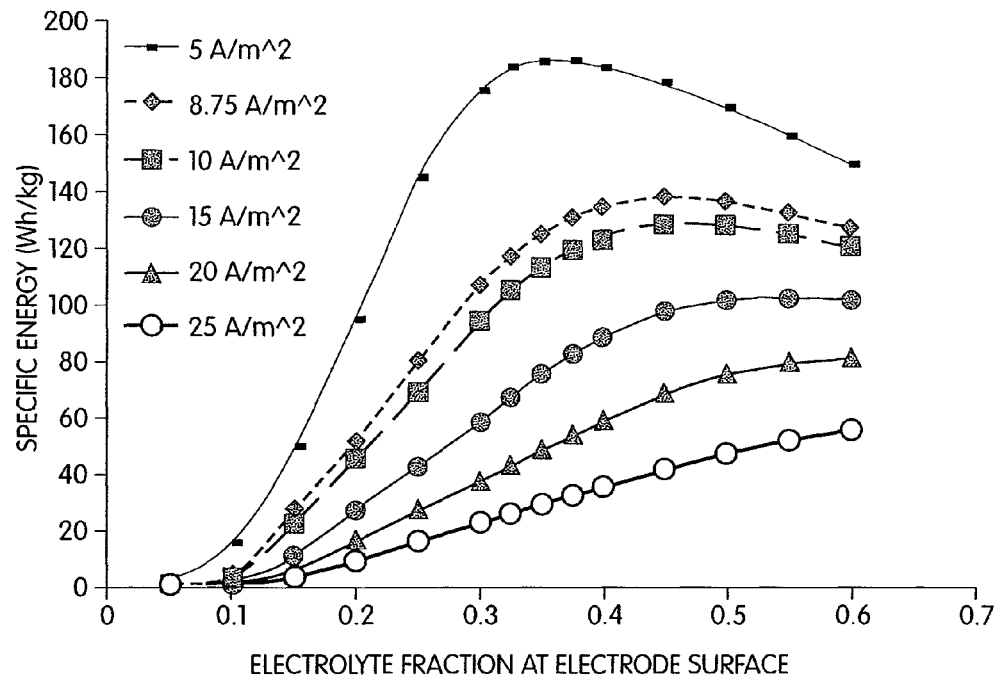
FIG. 10 is a graph showing the specific energy as a function of electrolyte fraction at the surface of a graded porosity structure in a bipolar device according to one embodiment of the present invention.
Figure 11:
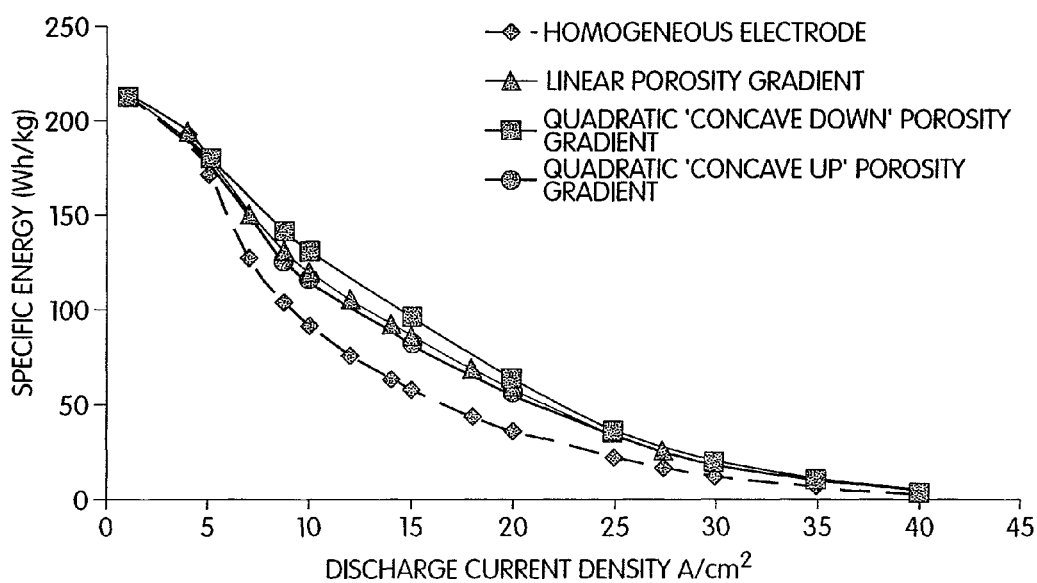
FIG. 11 is a graph showing the specific energy as a function of discharge current density in a bipolar device having a graded porosity structure according to one embodiment of the present invention.

FIG. 6 is a graphical illustration of the normalized cumulative ionic resistance as a function of electrode depth for each of the graded porosity electrodes shown in FIG. 5. Each of the graded porosity electrodes had a predicted lower cumulative ionic resistance than a conventional electrode near the surface and throughout the electrode. FIG. 7 is a graphical illustration of the normalized cumulative potential drop as a function of electrode depth for each of the graded porosity electrodes shown in FIG. 5. Each of the graded porosity electrodes has a lower potential drop than a conventional electrode near the surface as well as throughout the electrode. FIGS. 6 and 7 show that the graded porosity electrode has better ionic transport and potential properties that should translate to higher power and energy densities. Such performance can be graphically illustrated in FIGS. 8 and 9, which show, respectively, the specific energy relative to the current density and specific power, for a variety of graded porosity electrodes. FIG. 9 shows that the systems with graded porosity electrodes would supply more energy at a given power than a conventional electrode system. Moreover, FIG. 10, which is a graphical illustration of the specific energy as a function of porosity (electrolyte fraction at the electrode surface), shows that as the discharge current increases, the optimum electrode grading shifts from a slight porosity to more severe gradients at high current densities. It is believed that the shift follows from decreasing electrode utilization with increasing current where lower ion transport properties at the back of the electrode, especially for highly graded electrodes, inhibits utilization at low and moderate discharge rates. FIG. 11, which is a graphical illustration of specific energy as a function of discharge current density for systems with concave up, concave down and linearly gradient porosity electrodes, shows that the graded porosity systems have higher specific energy compared to a conventional, homogeneous electrode system, especially at the intermediate discharge rate regime.

In accordance with another embodiment, the electrode has a porosity gradient, from the current collector to the other electrode or the electrolyte, that has a slope that varies by less than or no more than 5% at any location along the electrode, preferably, by less than or no more than 10%, more preferably, by less than or no more than 15%. The change in slope can be stepwise or smooth.

In another embodiment, the structures have a mating surface that is reticulated with a surface area that is at least 1.5 times the theoretical surface area of a smooth, non-reticulated structure, preferably, the reticulated surface area is at least about 2.5 times, more preferably, at least about 3 times, even more preferably, at least 4 times, and most preferably, at least about 5 times.

In another embodiment, the reticulations have an aspect ratio that is at least about 2, preferably at least about 2.5, more preferably at least about 3.0, more preferably at least 3.0, more preferably at least about 4.0, and most preferably, at least about 5.0.

In another embodiment, the protrusions and indentations are separated by an average distance of less than about 100 microns. Preferably, the separation distance is less than about 50 microns, more preferably, less than 25 microns, most preferably, less than about 10 microns.

The function and advantage of these and other embodiments of the present invention will be more fully understood from the examples below. The following examples are intended to illustrate the benefits of the present invention, but do not exemplify the full scope of the invention.

EXAMPLES

Prophetic Example 1

Lithium Battery Prepared by Sequential Deposition

A suspension can be prepared of a fine powder lithium storage cathode such as $LiCoO_2$, $LiNiO_2$, $LiMnO_2$, $LiMn_2O_4$, $LiFePO_4$, $V_2O_5$, $Li_3Bi$, $Li_3Sb$, or other such cathodes well-known to those skilled in the art, in a solvent with a binder, optionally a conductive additive such as carbon, and other additives well-known to impart characteristics to the suspension allowing it to be deposited in thin layers using stenciling, screen printing, inkjet printing, or lithographic methods selected to allow a lateral resolution to the printed layer that is within the desired dimensional ranges. A separate like suspension can be prepared of a fine powder lithium storage anode such as carbon, Sn, Sb, Al, Zn, Ag, LiAl or other anode materials known to those skilled in the art. The cathode suspension and anode suspension are deposited layer by layer, providing a periodic or aperiodic reticulated or interdigitated structure as described above and as shown in FIG. 3. Electronic contact, shorting, between the cathode and the anode is avoided by selecting the solvent and binder system such that a continuous (wetting) surface layer of the binder forms upon drying, and/or by depositing the layers such that, within the same layer, cathode patterns and anode patterns are adequately separated. Optionally, a third suspension containing binder and no cathode or anode or conductive additive can be deposited in a pattern at the interface of the cathode and anode patterns to ensure electronic isolation of the two.

A metal foil or fine mesh current collector made of, for example, aluminum or copper, can be used as the substrate upon which layers are deposited. Aluminum is preferred when the cathode compound forms a first continuous layer and copper is preferred when the anode forms a first continuous layer. After sequential deposition is complete, and the assembly is dried and, optionally, heated for consolidation, a second current collector can be applied to the surface of the layered battery. Optionally, the top current collector is formed by printing as a conductive ink using techniques such as those used for forming patterned interconnects as those used by those skilled in the art of electronic device fabrication. Optionally, the battery is deposited on an insulating film such as, but not limited to, polyethylene or polyester such as MYLAR® film, available from the E.I. du Pont de Nemours and Company (Wilmington, Del.), from which the battery can be subsequently removed and current collectors can be applied to form contacts with the anode and cathode.

The binder is, for example, a solid polymer electrolyte. This should obviate the need for liquid electrolyte in the battery, and, in some instance, serves to bind the particles securely together in the assembled device while allowing liquid electrolyte to be infused (flooded) throughout the battery. An example of suitable solid polymer electrolyte includes, is not limited to, (poly)ethylene oxide in which a lithium salt such as lithium perchlorate or lithium triflate has been added. An example of a binder and liquid electrolyte that remains dimensionally stable, i.e., the electrolyte does not dissolve the binder, is (poly)ethylene difluoride (PVdF) and ethylene carbonate-dimethyl carbonate (EC:DMC) in a 1:1 molar ratio to which a lithium salt has been added.

Prophetic Example 2

Battery Produced by Printing and Coating

A first electrode with a reticulated or interdigitated structure, either cathode or anode, is prepared using the materials and methods of Example 1. At the free surface of the printed structure, a continuous film of a binder or polymer electrolyte can be formed. The film can form a physical separator between anode and cathode. The film can be formed by self-segregation (wetting) of the binder solution to the free surface of the printed electrode. Optionally, the surface film can be formed by coating with a liquid binder or electrolyte solution followed by drying, or by vapor deposition techniques known to those skilled in the art of thin film materials preparation.

A conformal coating of a liquid suspension can be applied to the formed structure to create the counter electrode. The indentations of the latter fill in complementary fashion to the structure of the first electrode, leaving a smooth and flat outer surface to which a current collector is subsequently applied. Multiple coatings may be used to achieve conformal filling. The system can then be dried and optionally heated for consolidation. A current collector can be applied to one or both surfaces to complete the system.

Prophetic Example 3

Battery Produced by Embossing and Coating

A layer of a first electrode, either cathode or anode, formulated of the materials and by the methods of Example 1, is cast or coated in a layer upon a metal foil current collector or an insulating film. This layer is formulated by methods known to those skilled in the art to have rheological characteristics appropriate for thick film processing, for example, by screen printing, tape casting, web coating, and similar processes. The surface of the first layer is then embossed with a die to leave a reticulated surface with dimensions as desired. To this shaped surface is applied a counterelectrode by the conformal coating material and process described in Example 2. The assembly is dried and optionally heated for consolidation and a current collector is applied.

A film of binder or electrolyte is applied before or after the embossing step, and before coating with the counterelectrode formulation.

Prophetic Example No. 4

Subtractive Patterning Followed by Filling

A layer of a first electrode, either cathode or anode, formulated of the materials and by the methods of Example 1, is cast or coated in a layer upon a metal foil current collector or an insulating film. Optionally the electrode is cast or coated as a suspension upon a metal foil current collector and fired to obtain a continuous solid film of the storage material, or deposited as a solid film by a vapor deposition process known to those skilled in the art, such as sputtering, evaporation, chemical vapor deposition. The layer of first electrode is subtractively patterned, that is, material is removed, to form the reticulated or interdigitated electrode topology of the invention, by lithographic masking followed by chemical or reactive-ion etching, laser removal, or other such methods known in thick and thin film materials processing. Upon the patterned first electrode is optionally deposited a film of binder or electrolyte, followed by coating with the counter-electrode so as to conformally fill the pattern in the first electrode, by the method of Example 3.

Prophetic Example 5

Graded Porosity Electrode Produced by Differential Sedimentation

It is well-known to those skilled in the art of powder processing that the Stokes' settling rate of particles in a fluid is a function of the size and shape of the particles, the difference in density between the particle and the fluid within which it is settling, and the fluid viscosity. For the same particle material, smaller particles tend to settle slower than larger particles, and anisometric particles such as rods of large length to diameter ratio, or plates of large width to thickness ratio, settle at a slower average rate than spheres or equiaxed particles of identical volume. It is furthermore known that highly aspected particles tend to settle to a lower packing density than equiaxed particles of the same material. Therefore a method for introducing a porosity gradient into a layer of storage electrode fabricated from a powder mixture or suspension is use a mixture of particle sizes and shapes.

A suspension is made of a cathode oxide powder in which the powder contains a distribution of particle sizes and shapes. Equiaxed particles are mixed with platelet-shaped particles, with the particles sizes selected such that the equiaxed particles have a higher Stokes' settling velocity. The powder is formulated with a binder (such as PVdF), a fine conductive additive (such as high surface area carbon) and a solvent to produce a castable suspension. The suspension is formulated to allow differential sedimentation of the cathode oxide particles within a few minutes to a few hours after casting a film from the suspension. The film is cast, printed, or coated on a metal foil current collector or an insulating film, whereupon differential sedimentation occurs under the force of gravity resulting in a higher packing density of equiaxed particles in the portion of the electrode adjacent to the metal current collector, and a lower packing density of anisometric particles away from the metal current collector. This introduces a desired porosity gradient in the electrode. After drying, the electrode is laminated with a separator and a counterelectrode and infused with organic liquid electrolyte to produce a battery cell. Optionally, a cathode oxide with high electronic conductivity, such as $LiMg_{0.05}Co_{0.95}O_2$, is used and no carbon additive is used.

A graded porosity carbon anode is produced in like manner, using carbon powder selected to have a mixture of equiaxed particle shapes and anisometric particles shapes, as well as differences in density that allow the Stokes' settling rates to be adjusted. In one instance MCMB are used as the equiaxed carbon particle which settles more rapidly and forms a more densely packed region adjacent to the current collector, and flake graphite with platelet particle shape is used as the anisometric carbon particle which settles more slowly and forms the lower packing density region adjacent to the separator. The porosity gradient is adjusted by selecting the relative amounts of the particle forms and the size of the MCMB and flake graphite particles.

Prophetic Example 6

Graded Porosity Electrode Produced by Differential Sedimentation of a Fugitive Filler In this example, a suspension is used to form a cast, printed, or coated layer of electrode as in Example 5. However, the electrode storage material is mixed in the suspension with one or more additional solid materials which upon heating are removed, thereby leaving behind porosity. Therefore the solid material that is removed is a "fugitive" pore former. The density, particle size and size distribution, and particle shape of the electrode storage material and the fugitive pore former are selected to provide a differential Stokes' settling rate giving in the final product a more densely packed storage material adjacent to the current collector, and less densely packed storage material adjacent to the separator.

In one instance the storage material is an oxide cathode such as $LiCoO_2$, $LiMg_{0.05}Co_{0.95}O_2$, $LiMnO_2$, or $LiFePO_4$. The fugitive pore former is MCMB, selected to have a particle size giving a slower Stokes' settling rate than the cathode oxide. A suspension is prepared containing these two solids as well as a solvent and optionally a binder, the specific formulation being selected to allow differential sedimentation of the cathode oxide and MCMB. The suspension is cast, printed, or coated on a metal current collector and fired in an oxidizing ambient that pyrolyses the MCMB and sinters the cathode oxide to form a connected layer. The sintered porous cathode layer contains a desired porosity gradient once the MCMB has been removed.

In another instance, the fugitive pore former consists of particles of an organic or inorganic compound with a melting point between about 0° C. and 800° C. The preparation of the suspension and the casting process are carried out below the melting point of the compound. Subsequently, the cast, printed, or coated film is heated above the melting point of the organic compound allowing it to be drained or evaporated from the porous electrode, leaving a desired porosity gradient.

In still another embodiment, the fugitive pore former is a solid with a high vapor pressure, such as napthalene, and which is removed by sublimation rather than melting, leaving a desired porosity gradient.

Those skilled in the art should appreciate that all parameters and configurations described herein are meant to be exemplary and that actual parameters and configurations will depend upon the specific application in which the systems and methods of the present invention are used. Those skilled in the art should recognize, or be able to ascertain, using no more than routine experimentation, many equivalents to the specific embodiments of the invention described herein. For example, the selection and sizing of the channels in perforated electrodes is considered to require no more than routine experimentation. It is, therefore, to be understood that the foregoing embodiments are presented by way of example only and that, within the scope of the appended claims and equivalents thereto, the invention may be practiced otherwise than as specifically described. The present invention is directed to each feature, system, or method described herein. In addition, any combination of two or more features, systems or methods, if such features, systems or methods are not mutually inconsistent, is considered to be within the scope of the present invention. For example, the use of channels in reticulated electrodes or the incorporation of a porosity gradient with perforated or reticulated electrode is considered to be within the scope of the present invention.

What is claimed is:

1. An energy storage device, comprising:
    a first electrode;
    a second electrode;
    a first current collector in electronic communication with the first electrode;
    a second current collector in electronic communication with the second electrode; and
    an electrolyte in ionic communication with the first and second electrodes, wherein at least one of the first and second electrodes includes a portion having an average porosity and an ionically interconnected porosity that increases in a direction from the current collector with which the electrode is in electrical communication toward the other electrode or current collector to define a porosity gradient, wherein the porosity at each extreme of the gradient is at least 10% different from the average porosity.

2. The energy storage device of claim 1, further comprising a porous separator separating the first electrode and second electrode, the electrolyte permeating the separator and at least a portion of the porous portion of the first electrode.

3. The energy storage device of claim 1, wherein the first and second electrodes each include a porous portion adapted to receive the electrolyte, each of the first and second electrodes having a porosity that increases in a direction toward the other electrode or current collector.

4. The energy storage device of claim 1, wherein at least one of the first and second electrodes has a porous portion with an average porosity of from about 10 to about 70%.

5. The energy storage device of claim 1, wherein at least one of the first and second electrodes has a porous portion with an average porosity of from about 20 to 50%.

6. The energy storage device of claim 1, wherein at least one of the first and second electrodes has a porous portion with an average porosity of from about 30 to 45%.

7. The energy storage device of claim 1, wherein the porosity at each extreme of the gradient is at least 20% different from the average porosity.

8. The energy storage device of claim 1, wherein the porosity at each extreme of the gradient is at least 30% different from the average porosity.

9. The energy storage device of claim 1, wherein the porosity of any cross section of the first electrode perpendicular to a line connecting the center of mass of the current collector and the center of mass of the second electrode is uniform to +/−10%.

10. The energy storage device of claim 1, wherein the porosity of any cross section of the first electrode perpendicular to a line connecting the center of mass of the current collector and the center of mass of the second electrode is uniform to +/−5%.

11. The energy storage device of claim 1, wherein the porosity of any cross section of the first electrode perpendicular to a line connecting the center of mass of the current collector and the center of mass of the second electrode is uniform to +/−3%.

12. The energy storage device of claim 1, wherein the porosity of any cross section of the first electrode perpendicular to a line connecting the center of mass of the current collector and the center of mass of the second electrode is uniform to +/−1%.

13. The energy storage device of claim 1, wherein the porosity gradient is defined by a quadratic function.

14. The energy storage device of claim 1, wherein the porosity gradient is linear.

15. The energy storage device of claim 1, wherein at least one of the first and second electrodes has a reticulating surface defining a plurality of protrusions and intervening indentations, providing a surface area at least 1.5 times greater than the theoretical surface area of a smooth, non-reticulating configuration.

* * * * *